Patented Mar. 30, 1954

2,673,844

UNITED STATES PATENT OFFICE 2,673,844

DUSTING OF RUBBERLIKE MATERIALS WITH CELLULOSE

John R. Gilcrease, Baton Rouge, La., assignor to Standard Oil Development Company, a corporation of Delaware No Drawing. Application December 22, 1950, Serial No. 202,419

7 Claims. (Cl. 260—17.4)

This invention relates to rubbery materials and relates particularly to a means for coating tacky materials such as butadiene-nitrile rubber crumbs so as to prevent the individual rubber particles from sticking together or coalescing.

It is well known that most uncured or raw stocks of rubber-like materials, because of their appreciable tack, require surface dusting with various powders to prevent adhesion to containers or coalescence of separate rubber-like particles during storage and the like. Especially in the case of rubber-like materials which are in the form of small pellets or crumbs, such as are increasingly in demand for compounding with resins, molding or for the formation of liquid solutions, the problem of preventing coalescence during storage has been gaining in importance.

Common dusting powders heretofore used for this purpose have included principally talc, soapstone, zinc stearate and similar inorganic substances and organic metal salts. However, the use of all these materials has been only moderately successful since all such materials gradually tend to sink into the dusted surface of the rubber particles, or some become at least partially dissolved therein. Hence the effectiveness of the powders disappears with time, particularly when relatively high ambient temperatures lower the viscosity of the rubber-like material. Moreover, some of the prior art dusting materials, when used in concentrations required to give reasonably effective protection, have the disadvantage of interfering with the eventual cure of the dusted rubber and often they affect adversely the electrical and other properties of the final vulcanizate.

A surprisingly effective dusting material has now been discovered in cellulose, particularly in fibrous wood cellulose of a certain kind described subsequently.

This invention is particularly applicable to nitrile rubber, that is, to emulsion copolymers of a major proportion of a conjugated $C_4$ to $C_6$ diolefin, e. g. 50 to 85 parts of butadiene-1,3, isoprene or 2,3-dimethylbutadiene-1,3 and a minor proportion of a nitrile, e. g. 50 to 15 parts of acrylonitrile, alpha-methacrylonitrile or alpha-chloracrylonitrile. It is of special value in conjunction with crumbs of nitrile rubber having a nitrile content between about 25 and 35% and having a Mooney viscosity between about 40 to 90, which type of polymers have a very pronounced cohesion tendency because of the relatively soft nature. However, the invention offers some degree of improvement also with harder nitrile rubbers, as well as with natural rubber, GR-S type rubbers (emulsion copolymers of 60 to 85 parts of a diolefin such as butadiene or isoprene with 40 to 15 parts of styrene), polychloroprene rubbers, polysulfide type rubbers, GR-I type rubbers (copolymers of a major proportion of isobutylene and a minor proportion of isoprene or butadiene), as well as with rubber-like polyethylene, polyisobutylene having a Staudinger molecular weight between about 60,000 and 200,000 or more, styrene-isobutylene polymers such as are described in U. S. Patent 2,274,749 and so forth.

The dusting material of the invention is an essentially pure, powdered cellulose fiber having an average particle size of 30 to 200 microns, preferably about 100 to 165 microns. When subjected to a screen analysis, essentially all of the preferred cellulose material ("Solka-Floc") passes through 35 mesh, 65 to 85% passes through 100 mesh and about 30 to 50% passes through 200 mesh (Tyler scale). The material is a primary pure cellulose product obtained from wood by the sulfite and/or caustic process which separates lignin and other substances from the desired cellulosic fiber. The pure cellulosic product used in the invention has no direct relation to and is not interchangeable with wood floor. The desired powdered fiber is essentially white, may contain up to about 5 or 10% of moisture, has a specific gravity of 1.58 and a bulk density of about 2 to 7 cc./gram, preferably about 4 to 7 cc./gram.

Other materials which are similarly useful, though not quite so effective, are other cellulosic fibers having approximately the same dimensional characteristics and specific gravity between about 1.3 and 2.0, such as powdered cotton fibers or even rayon and other regenerated cellulose fibers. Ordinary wood flour, even if its average particle size is within the limits above specified, has been found ineffective for purposes of this invention, presumably because its irregular, more or less round shape makes occlusion in the rubber relatively easy. In contrast, fibrous materials particularly suited for the present invention have an elongated shape characterized by a substantially greater length than diameter, so that even if such a fibrous particle becomes partially embedded in the rubber a substantial part of the particle will remain above the surface and protect the latter against coalescence. Furthermore, ordinary wood flour is not nearly so effective because of its lignin content which materially affects its anti-coalescent effectiveness.

The following examples illustrate the present invention, though it will be understood that the latter is not limited thereto. All quantities expressed therein, as well as in the rest of the specification and claims, are expressed on a weight basis unless otherwise indicated.

Example 1

A commercial-grade, rubber-like nitrile copolymer of about 74% combined butadiene and 26% combined acrylonitrile having a Mooney viscosity of about 60 was prepared by conventional emulsion technique carrying the polymerization to about 75% conversion. The latex resulting from this polymerization was short-stopped in a conventional manner to prevent further polymerization, an antioxidant such as 2,6-di-tert-butyl-4-methyl phenol was added thereto, and stripped of unreacted monomers in the usual manner. The stripped latex was coagulated with a concentrated sodium chloride solution, and the particles of coagulated polymer were screened from the aqueous liquid, passed through a roller to remove excess water and through a hammer mill where it was restored to its original granular coagulate size, and dried in a hot air oven at a temperature of about 5° C. to 90° C., preferably about 70° C. The dried coagulate was in the form of an agglomerated sheet and this was returned once more to the hammer mill where it was again shredded approximately to its original crumb size, corresponding to particle diameters ranging from about $\frac{1}{32}$ to 1 inch, or mostly from about $\frac{1}{16}$ to $\frac{1}{2}$ inch. Some of the resulting product, known in the art as dry crumb, was finally pressed into 50 lb. bales for packaging. Both the loose crumb and the pressed bales formed a solid mass when stored for 60 days in cardboard containers under simulated storage conditions, i. e. at a temperature which varied during the course of the test between 65° F. and 97° F. Another hammer mill operation was necessary to produce crumbs from the stored product. This illustrates the impossibility of preserving nitrile rubber in loose crumb form for any extended period under ordinary storage conditions.

On the other hand, samples of the above-described dry nitrile rubber crumbs were mixed, respectively, with 1%, 2%, 4%, 6% and 10% (based on a rubber) of the preferred powdered pure wood cellulose fiber described earlier herein by shaking the nitrile rubber crumbs and the stated amounts of cellulose in a closed container, until the cellulose dust was uniformly distributed around the rubber crumbs. When these samples of cellulose coated rubber crumbs were stored for 60 days under the same conditions as in the case of the undusted product described above, the samples containing 4% or more of the cellulose dust remained free flowing, and even those containing between 1% and 4% of cellulose dust formed loosely bound bales which were reshredded without almost any effort, as by a simple rubbing between hands or by a mere dropping on the floor.

Example 2

The comparative effectiveness of the novel fibrous cellulose and conventional dusting agents is summarized in the following data obtained on two commercial grades of butadiene-acrylonitrile rubber crumb having a Mooney viscosity value of 90, a combined nitrile content of 35% and 26% respectively, and an average particle diameter of about 2 to 4 mm. The dry rubber crumbs were coated with the type and amount of dusting agent indicated in the table below, the dusting operation having been carried out by vigorous shaking of the rubber crumb and dusting agent in a closed one-quart container for approximately 20 seconds.

TABLE

| Rubber Grade | Coating Agent | Storage Time, Months | Concentration of Coating Agent and Conditions of Sample After Storage [3] | | | | | | Other Comments |
|---|---|---|---|---|---|---|---|---|---|
| | | | 2% | 3% | 4% | 6% | 8% | 10% | |
| (1) | None | 1 | N. G. | N. G. | N. G. | N. G. | N. G. | N. G. | |
| (1) | Vinylite Powder [4] | 8 | | | N. G. | S | S | S | |
| (1) | Marvinol Powder [5] | 8 | | | N. G. | S | S | S | |
| (1) | Cellulose Fiber [6] | 8 | S | S | E | E | E | E | |
| (1) | Calcium Silicate [7] | 8 | E | E | E | | | | Retards mercaptobenzothiazole accelerators. |
| (2) | None | 1 | N. G. | N. G. | N. G. | N. G. | N. G. | N. G. | |
| (2) | Wood Flour [8] | 1 | N. G. | | N. G. | N. G. | S | S | |
| (2) | Marvinol Powder [5] | 1 | N. G. | | N. G. | S | E | E | |
| (2) | Cellulose Fiber [6] | 8 | S | S | E | E | E | | |

[1] Paracril 35 NS 90 (copolymer of 65% butadiene-35% acrylonitrile; Mooney viscosity 90).
[2] Paracril 26 NS 90 (copolymer of 74% butadiene-26% acrylonitrile; Mooney viscosity 90).
[3] Code: E—excellent (crumbs remained free flowing after storage); S—satisfactory (crumbs were loosely bound after storage); N. G.—no good (crumbs coalesced into a solid mass during storage).
[4] Vinylite VYHH, powdered vinyl chloride-acetate copolymer of 85% vinyl chloride; ave. M. W. 10,000.
[5] Marvinol VR-10, vinyl chloride polymer, size 100% through 60 mesh, sp. gr. 1.4.
[6] Solka-Floc SW40A, pure wood cellulose fiber, ave. particle size 165 microns, size 77% through 100 mesh and 40% through 200 mesh, sp. gr. 1.58; bulk 6.8 cc./gram.
[7] Silene EF, hydrated precipitated calcium silicate, particle size 0.2 to 0.3 micron, sp. gr. 2.1.
[8] Masonoid, wood flour, size 100% through 80 mesh.

The data show that in the absence of any dusting agent the rubber crumbs coalesce into a solid mass within one month. And even with common dusting agents such as powdered vinyl chloride polymers or wood flour, the crumbs coalesce excessively unless the dusting agent is used in relatively large amounts, e. g., at least 5 to 7% by weight of the rubber, and even then some binding of the particles will occur.

On the other hand, calcium silicate proved very effective in preventing coalescence of the individual particles during storage but, as is well known, its presence exerts an undesirable retarding effect on the eventual cure of the rubber, especially when an accelerator of the mercaptobenzothiazole type is used in the compounding recipe. Aluminum stearate, not shown here, is likewise a fairly effective dusting agent when used in concentrations of at least 4%, but it too retards the cure of the rubber. Conversely, still other dusting agents such as zinc stearate or calcium carbonate, while fairly effective in preventing coalescence when used in adequate concentration, may also be objectionable since they tend to shorten the curing time and occasionally may even lead to scorching of the compounded stock during preliminary processing.

In contrast to all of the agents discussed above, the powdered cellulose fiber has proved to be an exceptionally effective dusting agent even at relatively low concentrations, and being entirely inert and without effect on the eventual cure, it permits an entirely free choice of vulcanization formula. Specifically, the tests show that as little as about 1.0% of cellulose fiber dust per weight of polymer is adequate for reducing the coalescence of the polymer particles to a value sufficiently low for many purposes; and in concentrations of about 4% to 10% of the cellulose fiber dust any tendency to coalesce between individual polymer particles is substantially completely eliminated.

The rubber particles coated in accordance with the teaching of the present invention are highly useful for blending with other materials, and in general the small amount of cellulose dust has no noticeable effect on the physical properties or appearance of the blend. For instance, the coated nitrile rubber crumbs can be readily blended with polyvinyl chloride-acetate resins in the usual manner. Also, due to their relatively small size, the discrete nitrile rubber crumbs obtainable by means of the present invention are readily dissolved in solvents such as methyl ethyl ketone for subsequent use as a coating or a cement. Here again, the presence of the cellulose dust is usually unobjectionable. In special cases where the elimination of all foreign matter is essential because of product clarity considerations, and hence filtration of the polymer solutions is required whether or not a dusting agent was used, the cellulose dust of the invention may actually act as a filter aid.

While the invention has been illustrated in terms of certain specific embodiments, it will be understood that the described procedures may be modified and varied to give best results for any given set of conditions. For instance, the optimum proportion of cellulose dust may be found to differ somewhat from case to case depending on particle size and viscosity or tackiness of the rubbery polymer and also depending on the particle size of the cellulose dust. Also, while the given examples describe dusting of polymer particles by shaking in a closed container after the particles had been dried, it is equally feasible to carry out the dusting step otherwise, as by placing the dusting agent, by means of a vibrating proportioner or the like, in a screw conveyor such as is used in industry for carrying the rubber from one manufacturing stage to another, in which case proper dusting may be obtained in the conveyor itself when the rubber is present there in the desired final size, or the dusting may take place in a shredder if the dusting agent is introduced into a conveyor carrying the coalesced rubber to a hammer mill or the like. Alternatively, it may be considered preferable to mix the cellulose dusting agent with the polymer particles in a rotary drier while the wet polymer particles are being dried; or the mixing may be done directly after coagulation of the latex and prior to drying of the coagulated particles, which procedure has the additional advantage of greatly reducing the usual agglomeration of the polymer particles in the drier. Another possible procedure involves adding the cellulose dust directly to the latex even prior to coagulation, though it will be understood that in such an instance somewhat larger amounts of dusting agent are required due to the fact that some of the cellulose dust becomes occluded in the polymer particles during coagulation and to that extent becomes unavailable for protecting the surfaces of the resulting polymer particles against agglomeration or coalescence.

Still other modifications or variations not specifically suggested herein may occur to persons skilled in the art without constituting a departure from the scope and spirit of the invention claimed below.

The invention claimed is:

1. As an article of manufacture, a rubbery butadiene emulsion polymer in crumb form, said crumbs having a particle size of about $\frac{1}{32}$ to 1 inch average diameter and being coated with at least 1.0% based on the weight of polymer of a dusting agent consisting of substantially pure fibrous wood cellulose reduced in size so that at least 65% of the ground particles pass through a 100-mesh screen.

2. An article of manufacture according to claim 1 wherein the rubbery crumbs consist essentially of a copolymer of 50 to 85 percent of butadiene-1,3 and 50 to 15 percent of acrylonitrile having a Mooney viscosity between 40 and 90.

3. An article of manufacture according to claim 2 wherein the dusting agent is a substantially pure, lignin-free, fibrous wood cellulose powder having a specific gravity of about 1.58, a bulk density between about 4 and 7 cc./gram and reduced in size so that 65 to 85% thereof passes through a 100-mesh screen and 30 to 50% passes through a 200-mesh screen.

4. A process which comprises coating of the surface of a mass of discrete particles of a rubbery copolymer of about 50 to 85% of a conjugated $C_4$ to $C_6$ diolefin and 50 to 15% of acrylonitrile having a Mooney viscosity between 40 and 90 with 1.5 to 10% based on the copolymer of substantially pure fibrous cellulose powder having an average particle size between about 30 and 200 microns.

5. In a process of making rubber crumb, the improvement which comprises shaking 100 parts of a mass of discrete particles of a dry rubbery copolymer of about 25 to 35% acrylonitrile and 75 to 65% of butadiene-1,3 having a Mooney viscosity between 40 and 90, said rubbery particles having a diameter in the range between $\frac{1}{32}$ and 1 inch, and 1.0 to 10% based on the rubber of a substantially pure fibrous wood cellulose powder having an average particle size between 100 and 165 microns, the shaking being continued until said cellulose powder becomes distributed around the rubbery particles.

6. In a process of making rubber crumb, the improvement which comprises coating the surface of freshly coagulated wet particles of a rubbery copolymer of 65 to 75% butadiene and 35 to 25% acrylonitrile having a Mooney viscosity between 40 and 90, said particles having a diameter in the range between $\frac{1}{32}$ and $\frac{1}{2}$ inch, and 4 to 10% based on the rubber of a substantially pure fibrous wood cellulose powder having an average particle size between 100 and 165 microns until a protective coating of said cellulose powder is distributed around the rubber particles, and thereafter drying the coated particles in an air drying zone maintained at a temperature between about 50 and 90° C.

7. A rubbery butadiene emulsion polymer in crumb form having the surface of discrete particles thereof coated with 1.0%, based on the polymer, of substantially pure fibrous wood cellulose.

JOHN R. GILCREASE.

References Cited in the file of this patent

UNITED STATES PATENTS

| Number | Name | Date |
|---|---|---|
| 2,391,714 | Kirby | Dec. 25, 1945 |
| 2,426,227 | Luaces | Aug. 26, 1947 |
| 2,460,367 | Sharpe | Feb. 1, 1949 |

FOREIGN PATENTS

| Number | Country | Date |
|---|---|---|
| 459,736 | Canada | Sept. 13, 1949 |

OTHER REFERENCES

Goodloe Rubber Age, vol. 61, pages 697–703, September 1947.

Compounding Ingredients for Rubber, Second Edition (1947), page 353.